United States Patent
Senba

(10) Patent No.: US 6,236,320 B1
(45) Date of Patent: May 22, 2001

(54) DETERMINATION OF AN AMBIENT TEMPERATURE THROUGH THE COMPARISON OF DIVIDED VOLTAGES

(75) Inventor: Hisanori Senba, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/513,759

(22) Filed: Feb. 25, 2000

(30) Foreign Application Priority Data

Mar. 4, 1999 (JP) .................................................. 11-057359

(51) Int. Cl.[7] .................................................. G08B 17/00
(52) U.S. Cl. .......................... 340/584; 340/587; 340/588; 340/589; 374/173; 374/178; 374/183; 374/185
(58) Field of Search .................................. 340/584, 587, 340/588, 589; 374/173, 178, 183, 185

(56) References Cited

U.S. PATENT DOCUMENTS

| | | | | |
|---|---|---|---|---|
| 3,933,046 | * | 1/1976 | Ebrecht | 331/66 |
| 4,109,196 | * | 8/1978 | Carmody | 324/62 |
| 4,603,306 | * | 7/1986 | Kleinberg | 331/66 |
| 5,254,975 | * | 10/1993 | Torikoshi | 340/589 |
| 5,655,305 | | 8/1997 | Fletcher | 374/170 |

FOREIGN PATENT DOCUMENTS

| | | | |
|---|---|---|---|
| 59-61725 | 4/1984 | (JP) | G01K/7/20 |
| 64-28 | 1/1989 | (JP) | G01K/7/24 |
| 64-54320 | 3/1989 | (JP) | G01K/7/00 |
| 3-13830 | 1/1991 | (JP) | G01K/7/20 |
| 6-273241 | 9/1994 | (JP) | G01K/7/20 |
| 6-347337 | 12/1994 | (JP) | G01K/7/00 |
| 8-283330 | 11/1996 | (JP) | H01M/10/48 |
| 8-294229 | 11/1996 | (JP) | H02H/5/04 |

OTHER PUBLICATIONS

Encyclopedia of Electronic Circuits—vol. 6 p. 645, Fig. 91–25 and p. 733–9/1995.*

* cited by examiner

Primary Examiner—Jeffery Hofsass
Assistant Examiner—Hung Nguyen
(74) Attorney, Agent, or Firm—Hayes, Soloway, Hennessey, Grossman & Hage, PC

(57) ABSTRACT

A temperature determining apparatus produces a predetermined reference voltage from an operating voltage supplied thereto from the outside, divides the reference voltage with a pair of resistance values having different temperature-resistance characteristics to produce a first divided voltage and divides the reference voltage with a pair of resistance values having the same temperature-resistance characteristic to produce a second divided voltage, and compares the first and second divided voltages to determine a threshold temperature. Since the reference voltage is constant as long as an ambient temperature is not changed even when the operating voltage is changed, the first and second divided voltages are not changed depending on the operating voltage, thereby allowing the determination of an ambient temperature with favorable accuracy in a wide range of operating voltages.

8 Claims, 3 Drawing Sheets

DETERMINATION OF AN AMBIENT TEMPERATURE THROUGH THE COMPARISON OF DIVIDED VOLTAGES

BACKGROUND OF THE INVENTION

1. Field of the Invention

The present invention relates to an apparatus for determining whether an ambient temperature is higher or lower than a predetermined threshold temperature.

2. Description of the Related Art

Electrical equipment has a defined temperature range in which normal operation is allowed. Thus, some electrical equipment contains a temperature determining apparatus which determines whether an ambient temperature is higher or lower than a predetermined threshold temperature.

In such electrical equipment, when the temperature determining apparatus determines that an ambient temperature exceeds a range in which its operation is ensured, forced termination of operation is performed for preventing a malfunction, or recording of histories is performed for checking user environments, for example. While the aforementioned temperature determining apparatuses include products which operate mechanically, the temperature determining apparatuses which operate electrically are generally utilized.

A prior art example of such an electrical temperature determining apparatus will be hereinafter described with reference to FIGS. 1 and 2. As shown in FIG. 1, a prior art temperature determining apparatus 100 comprises a resistance element 102, a diode 103, a reference voltage generating circuit 104, and a comparator circuit circuit 105.

Resistance element 102 and diode 103 are connected in series between an operating voltage Vdd for an electrical equipment and the ground. Reference voltage generating circuit 104 generates a reference voltage Vref from the operating voltage Vdd which is lower than the latter. One input terminal of comparator circuit 105 is connected with the junction between resistance element 102 and diode 103, and the other input terminal of comparator circuit 105 is connected with the output of reference voltage generating circuit 104.

Resistance element 102 has a predetermined temperature-resistance characteristic in which a resistance value varies with a change in an ambient temperature. Thus, a change in the ambient temperature causes a change in a divided voltage VD generated by resistance element 102 and diode 103 from the operating voltage Vdd. The values of Vdd and Vref are set and the temperature-resistance characteristic of resistance element 102 is selected such that the divided voltage VD is equal to the reference voltage Vref at a predetermined threshold temperature.

Comparator circuit 105 compares the divided voltage VD with the reference voltage Vref and outputs a signal indicative of whether the ambient temperature is higher or lower than the threshold temperature.

As shown in FIG. 2, the reference voltage Vref is constant in a range "a" in which the operating voltage Vdd exceeds Vdd0. Furthermore, when the operating voltage Vdd is changed depending on the specification of the electrical equipment or the like, the reference voltage Vref is also changed in accordance with the operating voltage Vdd even if the ambient temperature is constant. As a result, the range of the operating voltage Vdd in which a temperature can be determined, is limited to, for example a range "b" in FIG. 2.

Additionally, since the reference voltage Vref generated by reference voltage generating circuit 104 is temperature-dependent, the reference voltage Vref varies with a change in the ambient temperature, independently of the divided voltage V0. As a result, it is difficult for the temperature determining apparatus 100 to accurately determine whether an ambient temperature is higher or lower than the threshold temperature.

It is obvious that the aforementioned problems similarly occur in the temperature determining apparatus with a second resistance element in place of diode 103.

SUMMARY OF THE INVENTION

It is an object of the present invention to provide a temperature determining method and apparatus capable of accurately determining whether an ambient temperature is higher or lower than a threshold temperature.

The temperature determining apparatus according to the present invention comprises a first resistance-series circuit including a first and second resistance elements connected in series to each other, a second resistance-series circuit including a third and fourth resistance elements connected in series to each other, a voltage generating circuit, and a comparator.

The first and second resistance elements connected in series to each other in the first resistance-series circuit have different temperature-resistance characteristics. Thus, a change in an ambient temperature causes a change in the ratio of resistance values of the first and second resistance elements. On the other hand, the third and fourth resistance elements connected in series to each other in the second resistance-series circuit have the same temperature-resistance characteristic. Thus, the ratio of resistance values of the third and fourth resistance elements is not changed even when an ambient temperature is changed.

The voltage generating circuit applies the same reference voltage to the both ends of the first and second resistance-series circuits. The comparator circuit compares a first divided voltage generated at a junction between the first and second resistance elements with a second divided voltage generated at a junction between the third and fourth resistance elements to determine whether the ambient temperature is higher or lower than a predetermined temperature.

If the ambient temperature is not changed, a voltage output from the voltage generating circuit is constant even when an operating voltage is changed, and hence the first and second divided voltages are not changed. For this reason, it is possible to accurately determine whether the ambient temperature is higher or lower than the threshold temperature over a wide range of the operating voltage.

Additionally, even when a voltage output from the voltage generating circuit is changed due to the ambient temperature, the first and second divided voltages are not individually changed but interactively changed, so that a relative change in the divided voltage is small, thereby making it possible to accurately determine whether the ambient temperature is higher or lower than the threshold temperature.

According to an embodiment of the present invention, the temperature-resistance characteristics of the second resistance element is identical to those of the third and fourth resistance elements. Therefore, as the ambient temperature varies, the first divided voltage is obviously changed, while the second divided voltage remains constant. Accordingly, it is possible to accurately determine whether the ambient temperature is higher or lower than the threshold temperature.

According to a yet another embodiment of the present invention, the temperature-resistance characteristics of the second to fourth resistance elements are lower than that of the first resistance element. Therefore, when the ambient temperature varies, the resistance value of the first resistance element is changed lower than the resistance values of the second to fourth resistance elements. Thus, it is possible to reliably determine whether the ambient temperature is higher or lower than the threshold temperature with a simple configuration.

According to a still yet another embodiment of the present invention, the voltage generating circuit includes a power supply circuit for generating a predetermined power supply voltage, and an amplifier circuit for amplifying the power to said voltage. Therefore, it is possible to generate the voltage appropriate for the determination of a temperature.

In a yet further embodiment of the present invention, the power supply circuit includes a means for producing the constant power supply voltage if the operating voltage supplied from the outside is equal to or higher than the predetermined voltage. Therefore, it is possible to accurately determine the ambient temperature.

The above and other objects, features and advantages of the present invention will become apparent from the following description with reference to the accompanying drawings which illustrate examples of the present invention.

DETAILED DESCRIPTION OF THE PREFERRED EMBODIMENTS

Figure 1:
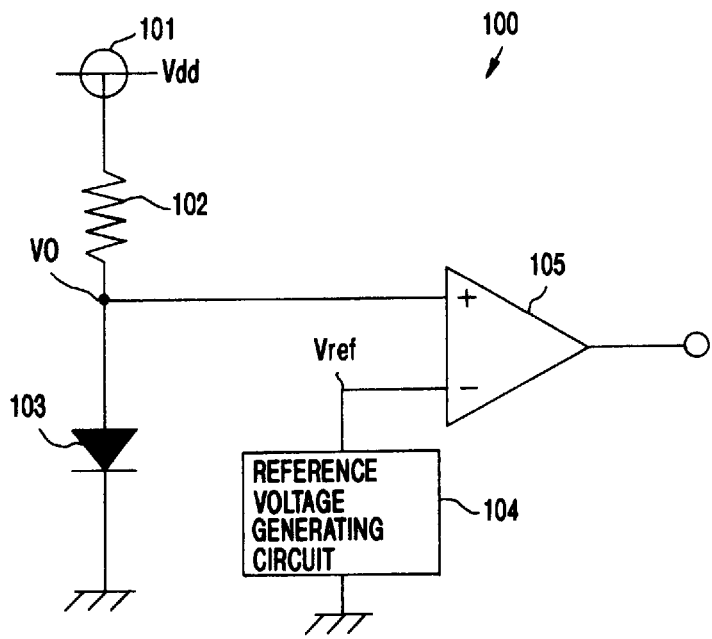
FIG. 1 is a circuit diagram of a prior art temperature determining apparatus.
Figure 2:
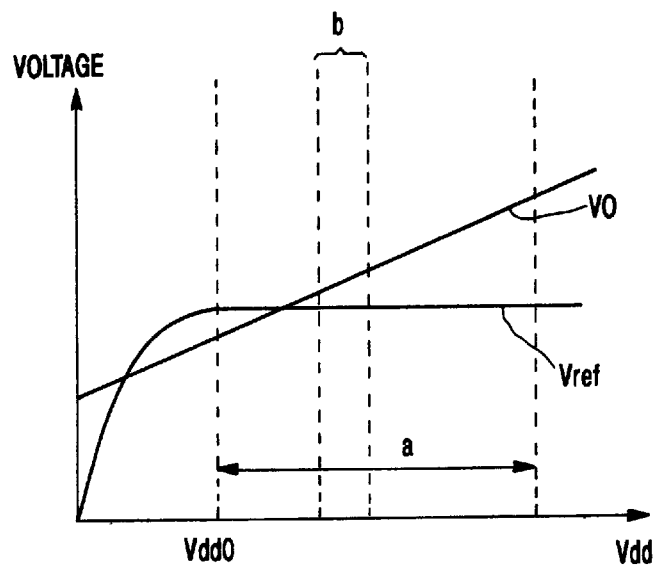
FIG. 2 is a view of relationships between a reference voltage Vref, a divided voltage V0, and an operating voltage Vdd.
Figure 3:
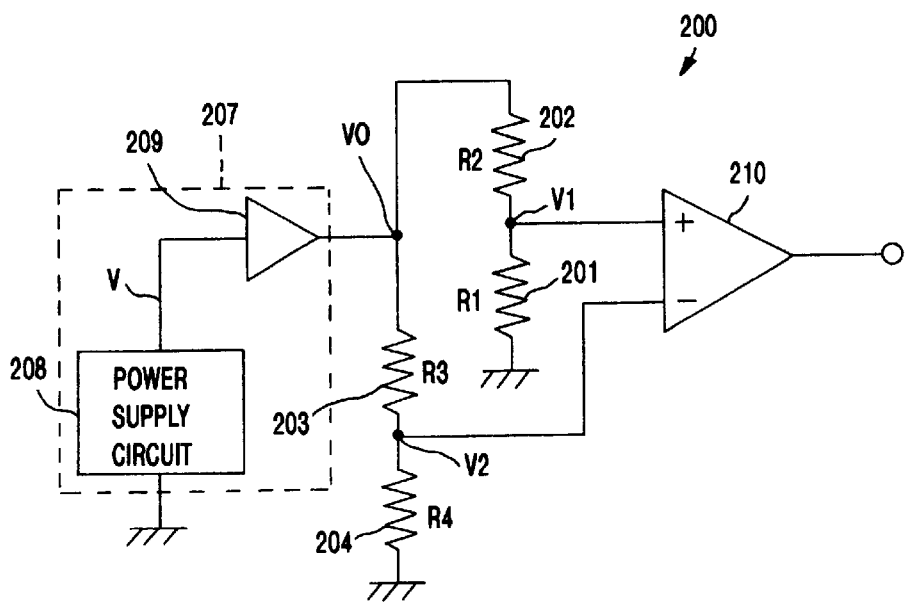
FIG. 3 is a circuit diagram of a temperature determining apparatus according to an embodiment of the present invention.

Referring to FIG. 3, there is shown a temperature determining apparatus 200 according to one embodiment of the present invention which comprises a voltage generating circuit 207, first to fourth resistance elements 201 to 204, and a comparator circuit 210. Voltage generating circuit 207 comprises a power supply circuit 208 that generates a predetermined power supply voltage, and amplifier circuit 209 that amplifies the predetermined power supply voltage and generates a voltage V0.

First and second resistance elements 201 and 202 are connected in series between an output of amplifier circuit 209 and the ground. Third and fourth resistance elements 203 and 204 are connected in series between another output of amplifier circuit 209 and the ground.

Figure 4:
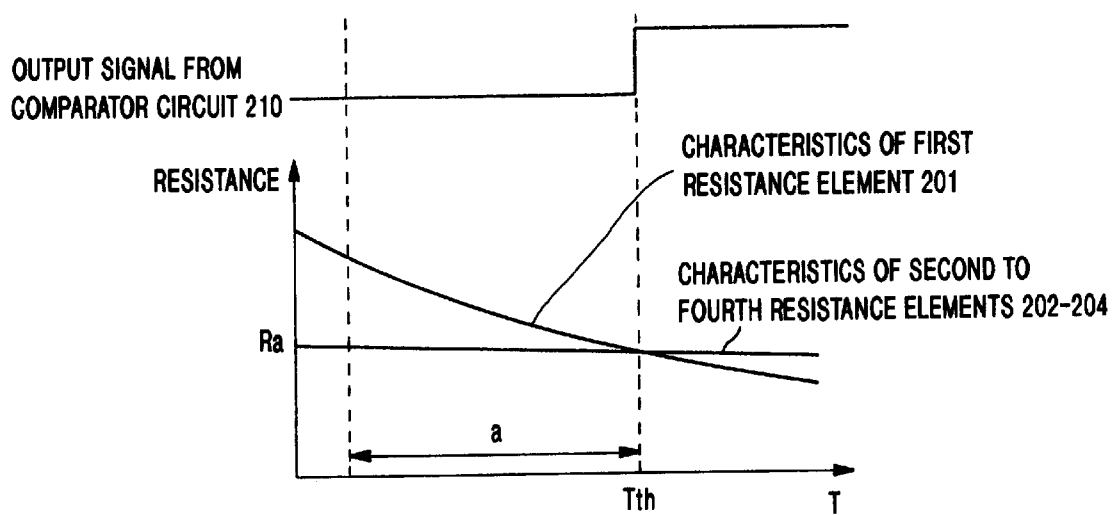
FIG. 4 is a view showing the temperature-resistance characteristics of the first to fourth resistance elements and determination result of the temperature determining apparatus.
Figure 5:
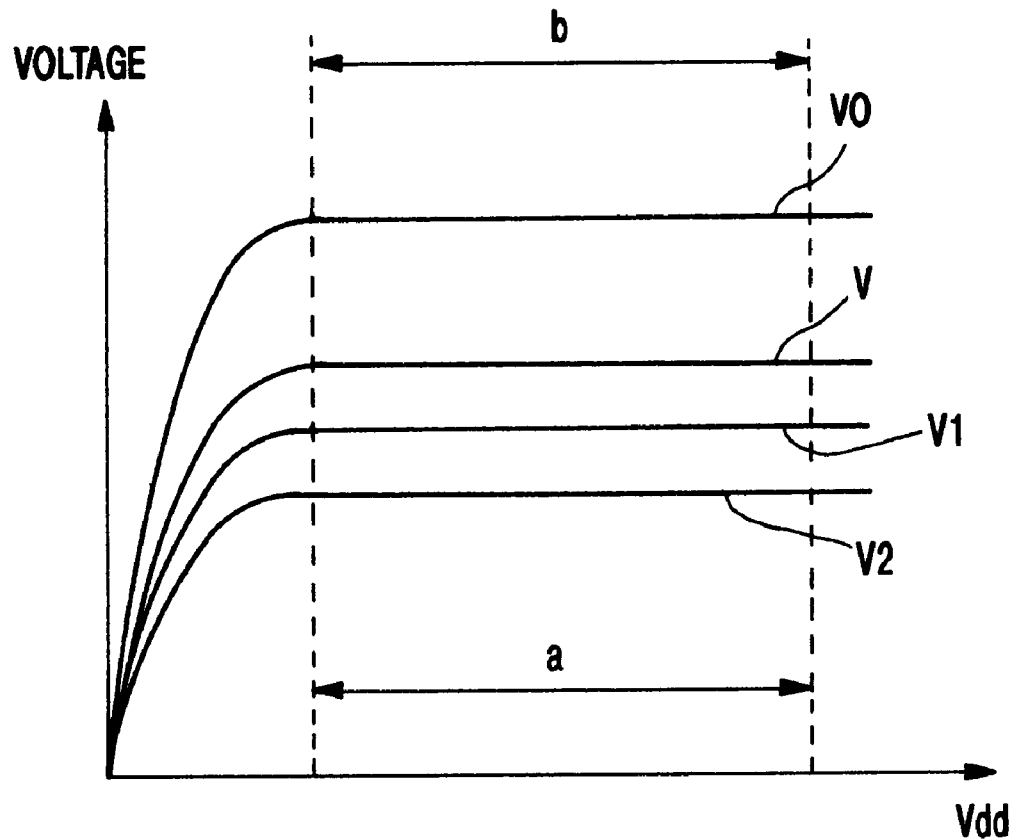
FIG. 5 is a view of relationships of the reference voltage Vref, divided voltages V1 and V2 versus the operating voltage Vdd.

As shown in FIG. 4, first resistance element 201 has a temperature-resistance characteristic in which its resistance value decreases with the increase of an ambient temperature, while second to fourth resistance elements 202, 203, and 204 have the same temperature-resistance characteristic in which its resistance value remains constant regardless of a change in the ambient temperature. Furthermore, the temperature-resistance characteristic of first to fourth resistance elements 201 to 204 are set such that the resistance values of first to fourth resistance elements 201 to 204 are the same value Ra when the ambient temperature is equal to a predetermined threshold temperature Tth.

Since the temperature-resistance characteristic of third resistance element 203 is the same as that of fourth resistance element 204, a divided voltage V2 generated at a junction between third and fourth resistance elements 203 and 204 from the voltage V0 remains constant even when the ambient temperature is varied.

On the other hand, since the temperature-resistance characteristic of first resistance element 201 differs from that of second resistance element 202, a divided voltage V1 generated at a junction between first and second resistance elements 201 and 202 from the voltage V0 varies with a change in the ambient temperature.

Comparator circuit 210 compares the divided voltage V1 with the divided voltage V2 to determine whether the ambient temperature is higher or lower than the threshold temperature Tth.

It should be noted that temperature determining apparatus 200 of the embodiment is actually contained in electrical equipment (not shown), and power supply circuit 208 is formed to produce a constant power supply voltage V if an operating voltage Vdd of the electrical equipment is equal to or higher than a predetermined voltage.

As a result, the determination of the ambient temperature is possible in a range in which the voltages V and V0 are constant, independently of the operating voltage Vdd.

While preferred embodiments of the present invention have been described using specific terms, such description is for illustrative purposes only, and it is to be understood that changes and variations may be made without departing from the spirit or scope of the following claims.

What is claimed is:

1. A method of determining a temperature, said method comprising the steps of:

generating a predetermined reference voltage;

dividing said reference voltage with a first pair of resistances having different temperature-resistance characteristic to produce a first divided voltage, and dividing said reference voltage with a second pair of resistances having the same temperature-resistance characteristic to produce a second divided voltage; and comparing said first divided voltage with said second divided voltage to determine whether an ambient temperature is higher or lower than a predetermined threshold temperature.

2. A temperature determining apparatus for determining whether an ambient temperature is higher or lower than a predetermined threshold temperature, said apparatus comprising:

a first resistance-series circuit including a first and second resistance elements connected in series to each other and having different temperature-resistance characteristics;

a second resistance-series circuit including a third and fourth resistance elements connected in series to each other and having the same temperature-resistance characteristic;

a voltage generating circuit for generating and applying a predetermined voltage in common to both ends of said first resistance-series circuit and said second resistance-series circuit; and a comparator circuit for comparing a first divided voltage generated at a junction between said first and second resistance elements with a second divided voltage generated at a junction between said third and fourth resistance elements to determine whether the ambient temperature is higher or lower than said threshold temperature.

3. The apparatus according to claim 2, wherein the temperature-resistance characteristic of said second resistance element is identical to those of said third and fourth resistance elements.

4. The apparatus according to claim 3, wherein the temperature-resistance characteristics of said second to fourth resistance elements are such that a resistance value remains constant regardless of the temperature, and a resistance value of said first resistance element is equal to those of the resistance values of said second to fourth resistance elements when said ambient temperature is equal to said threshold temperature.

5. The apparatus according to claim 3, wherein the temperature-resistance characteristics of said second to fourth resistance elements are lower than that of said first resistance element.

6. The apparatus according to claim 4, wherein the temperature-resistance characteristics of said second to fourth resistance elements are lower than that of said first resistance element.

7. The apparatus according to claim 2, wherein said voltage generating circuit includes:

a power supply circuit for generating a predetermined power supply voltage; and an amplifier circuit for amplifying said power supply voltage to said voltage.

8. The apparatus according to claim 7, wherein said power supply circuit includes a means for producing said constant power supply voltage if an operating voltage supplied from the outside is equal to or higher than the predetermined voltage.

* * * * *